US009144821B2

(12) United States Patent
Obrist

(10) Patent No.: US 9,144,821 B2
(45) Date of Patent: Sep. 29, 2015

(54) CARTRIDGE PISTON

(75) Inventor: Manfred Obrist, Lustenau (AT)

(73) Assignee: SULZER MIXPAC AG, Haag (CH)

( * ) Notice: Subject to any disclaimer, the term of this patent is extended or adjusted under 35 U.S.C. 154(b) by 445 days.

(21) Appl. No.: 13/514,179

(22) PCT Filed: Dec. 8, 2010

(86) PCT No.: PCT/EP2010/069199

§ 371 (c)(1),
(2), (4) Date: Jun. 6, 2012

(87) PCT Pub. No.: WO2011/070082

PCT Pub. Date: Jun. 16, 2011

(65) Prior Publication Data

US 2012/0247323 A1 Oct. 4, 2012

(30) Foreign Application Priority Data

Dec. 11, 2009 (EP) .................................... 09178940

(51) Int. Cl.

*F16J 1/00* (2006.01)
*B05C 17/005* (2006.01)
*B05B 11/02* (2006.01)
*B65D 83/00* (2006.01)

(52) U.S. Cl.

CPC ........... *B05C 17/00576* (2013.01); *B05B 11/02* (2013.01); *B05C 17/00559* (2013.01); *B05C 17/00579* (2013.01); *B65D 83/0005* (2013.01); *B65D 2205/04* (2013.01)

(58) Field of Classification Search

CPC ................... B05C 17/00576; B05C 17/00579; F16J 1/006

USPC .......................................................... 222/386

See application file for complete search history.

(56) References Cited

U.S. PATENT DOCUMENTS

| | | | |
|---|---|---|---|
| 4,691,847 | A | 9/1987 | Ford et al. |
| 6,375,045 | B1 | 4/2002 | Ki |
| 6,598,766 | B1 | 7/2003 | Brugner |
| 2002/0153391 | A1 | 10/2002 | Prestele |
| 2007/0119868 | A1 | 5/2007 | Kraemer |
| 2008/0083789 | A1 | 4/2008 | Brugner |

FOREIGN PATENT DOCUMENTS

| | | | |
|---|---|---|---|
| CH | 610 994 | A5 | 5/1979 |
| CN | 101157409 | A | 4/2008 |
| DE | 200 10 417 | U1 | 10/2001 |
| DE | 10 2005 060 527 | A1 | 6/2007 |
| EP | 1 165 400 | B1 | 1/2002 |
| WO | 2005023655 | A2 | 3/2005 |

OTHER PUBLICATIONS

International Search Report for International Patent Application No. PCT/EP2010/069199 mailed on Feb. 25, 2011.

*Primary Examiner* — F. Daniel Lopez
(74) *Attorney, Agent, or Firm* — Global IP Counselors, LLP

(57) ABSTRACT

A piston includes a piston body which is surrounded by a media side, by an oppositely disposed drive side and, at the peripheral side, by a piston jacket, wherein the piston jacket forms a connection between the media side and the drive side. The piston jacket is arranged about a piston axis, wherein the piston jacket is connected to the piston body via a web element so that a peripheral groove is formed on the media side between the piston body and the piston jacket. A cover element is arranged at the media side, and has a drive side surface which lies directly on the media side surface of the piston body.

18 Claims, 5 Drawing Sheets

CARTRIDGE PISTON

PRIORITY CLAIM

Figure 1:
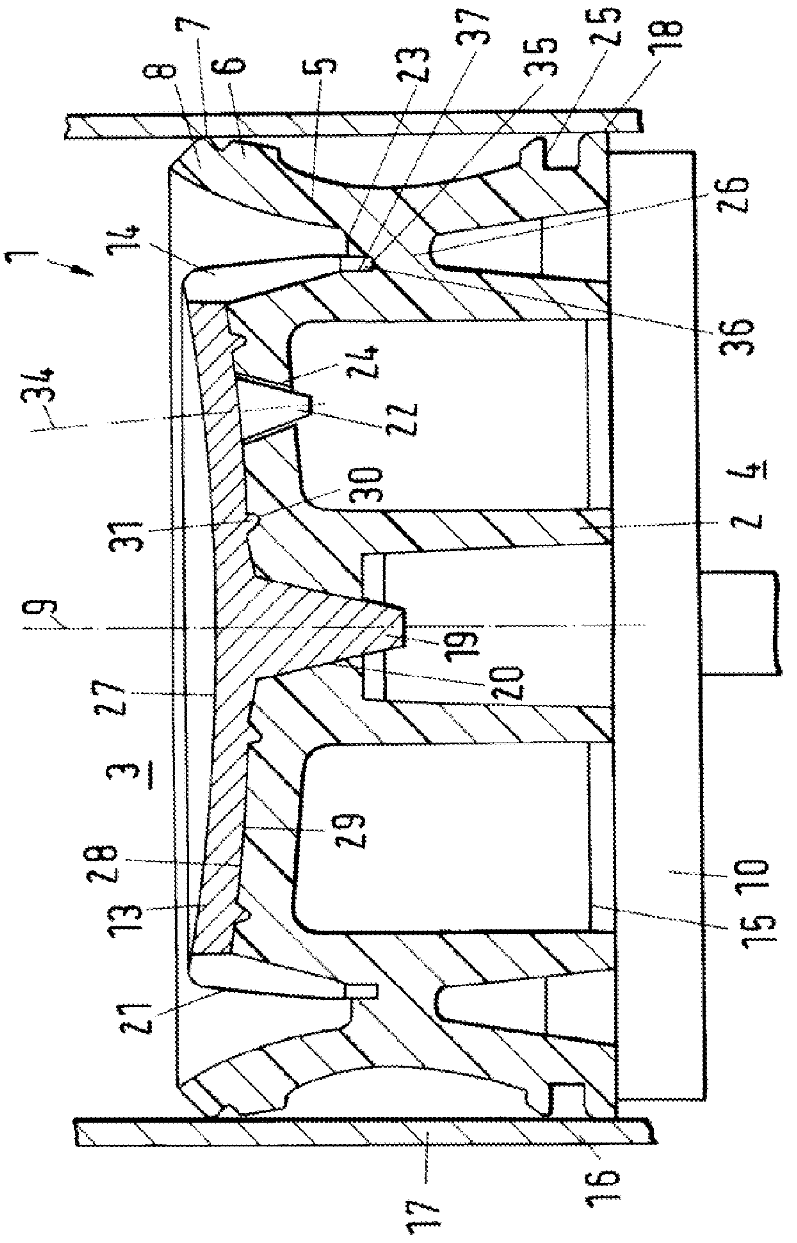

The present application is a National Stage of International Application No. PCT/EP2010/069199, filed on Dec. 8, 2010, which claims priority to European Patent Application No. 09178940.4 filed on Dec. 11, 2009, the entire contents of which are being incorporated herein by reference.

The invention relates to a piston for a cartridge, in particular for the dispensing of filler materials containing solids.

Such a piston is known, for example, from DE 200 10 417 U1. The piston has a first piston part which is provided with a sealing lip. The sealing lip contacts the cartridge wall.

A further already known piston is disclosed in EP 1 165 400 B1. This piston is made from a soft plastic, for example a low density polyethylene (LDPE) to achieve the required sealing to the cartridge wall. Such a piston may only be compatible with limitations with materials which form the filler material of the cartridge. To avoid the piston coming into contact with such materials along its media side, a cover plate is used which is made of a plastic which is resistant to the filler material. The cover plate covers a large part of the cross-sectional surface on the media side, with the exception of the marginal region which is adjacent to the cartridge wall. The marginal region is formed by a limb which extends outside the cover plate along the outer periphery of the piston in the direction of the media side. The limb is separated from the cover plate by a V-shaped groove. The limb in this embodiment is admittedly in contact with the filler material, the other regions of the piston are screened off by the cover plate. It applies to some filler materials that a contact with the piston material results in a swelling of the piston material so that an expansion occurs in the region of the limb. This has the advantage that the sealing effect is in all events amplified. Alternatively to this, a plurality of sealing lips can also be arranged at the piston circumference, such as is known, for example, from CH 610 994.

It is the object of the invention to provide an improvement to the named pistons so that the cover element and the piston body can be manufactured in a single workstep.

This object is satisfied by a piston which is manufactured in the multicomponent injection molding process, in particular in an assembly injection molding process. An assembly injection molding process is understood as an injection molding process in which at least one assembly step can be saved. In addition to the term assembly injection molding process, the term mobility injection molding process (“Beweglichkeitsspritzgussverfahren”) is also customary. Components which are in particular movable with respect to one another can be manufactured in one single workstep using this process, such as adjustable ventilation slots in ventilation elements or hinges.

The piston includes a piston body having a media side and a drive side which is disposed opposite the media side and a piston body and is bounded at the peripheral side by a piston jacket, wherein the media side has a media side surface with the piston jacket forming a connection between the media side and the drive side, with the piston jacket being arranged about a piston axis, with the piston jacket being connected to a piston body via a web element so that a peripheral groove is formed between the piston body and the piston jacket, the groove surrounding the media side surface, with a cover element being arranged at the media side, which has a media side surface and a drive side surface. The drive-side surface lies directly entirely on the surface of the piston body at the media side which means that the media side surface of the piston body and the drive side surface of the cover element contact each other substantially at the entire common surface, thus an areal contact is provided which extends substantially over the entire common surface.

The cover element is injected directly onto the surface of the piston body in a multicomponent injection molding process. The media side surface of the piston body therefore follows the contours of the drive side surface of the cover element. The media side surface of the piston body is therefore an image of the drive side surface of the cover element.

The piston material can merge on the media side into a projection which has a guide element for the guidance of the piston in a cartridge. This guide element forms a protective edge to prevent damage to the sealing lip during the manufacturing process. The sealing lip is suitable for the establishment of a sealing contact with a wall of the cartridge.

The cover element has a media side surface which is arranged disposed opposite the drive side surface, with the media side surface of the cover element being concave. In particular a surface having an dimple which is arranged at the media side surface should be understood as a concave surface in this respect. In a preferred embodiment, the dimple is a rotationally symmetrical indentation which has the form of a segment of a sphere or can also be designed as a polar segment of an ellipsoid if the cross-sectional surface of the piston is elliptical. It is also conceivable that the concave surface of the mold has the shape of an apex.

Combinations of the aforesaid forms for rotationally symmetrical or also non-rotationally symmetrical pistons are naturally also conceivable.

A bulge can be provided at the media side surface of the piston which engages into a corresponding indentation of the drive side surface of the cover element. Alternatively or in addition to this, an indentation can be provided at the media side surface of the piston body, said indentation engaging into a corresponding bulge of the drive side surface of the cover element such that the bulge is in touching contact with the indentation along their entire common surface.

The bulge can, for example, be a notch which is arranged about the piston axis as part of a ring. A plurality of notches can be arranged at different radial spacings from the piston axis.

The bulges can be arranged at least partially offset to one another so that an air flow takes place around the bulges. The bulges form a labyrinth structure through which air from the storage chambers of the cartridge can pass through the piston. This variant can in particular be considered for a notch which is designed in ring form and which satisfies a function as a sealing element.

The cover element in accordance with an advantageous embodiment contains a pin element or a valve element which extends through the piston body to the drive side of the piston. The pin element and/or the valve element can be made as a conical plug-in element. The pin element can furthermore be rotationally symmetrical with respect to the piston axis. The pin element and/or the valve element is movable with respect to the piston body, such that a connection passage is formable between the valve element and the piston body. The pin element or the valve element has each a corresponding end, which reaches over the drive side surface of the piston body, such that the pin element or the valve element is liftable from its corresponding seat under the effect of a pressurizing force, such that a venting gap for ventilation and a connection passage between the cover element and the piston body is formed.

A jacket-shaped support element can be attached to the surface at the media side at its periphery. This jacket-shaped support element can project into the groove which is formed between the piston body and the piston jacket.

The groove has a groove base, with a receiving element being attached to the groove base and with the margin of the jacket-shaped support element projecting into said receiving element.

The support element can contain at least one venting element in accordance with a preferred embodiment, whereby the venting element is connectable to the connection passage and a venting gap, in particular an annular venting gap.

The venting gap is made, for example, as a slit in the jacket-shaped support element. A plurality of venting gaps can be provided. These venting gaps can be distributed at the periphery of the jacket-shaped support element; the venting gaps can in particular be arranged at regular intervals to one another.

A method for the manufacture of a piston in accordance with any one of the preceding embodiments includes the steps of manufacturing the core body in an injection molding process and subsequent attaching of the cover element in a multicomponent injection molding process on the same injection molding apparatus.

A cartridge for the dispensing of a plurality of components contains at least one piston, preferably a plurality of pistons, with the components being arranged in hollow spaces of the cartridge arranged next to one another or coaxially. A dispensing device can furthermore be connected to the cartridge or the cartridge can be inserted into a dispensing device. The piston is movable by means of the dispensing device. The dispensing device is connectable to the piston at the drive side.

The piston in accordance with one of the preceding embodiments is particularly advantageously used for the dispensing of filler materials containing solids as well as for pasty or viscous materials.

Figure 2:
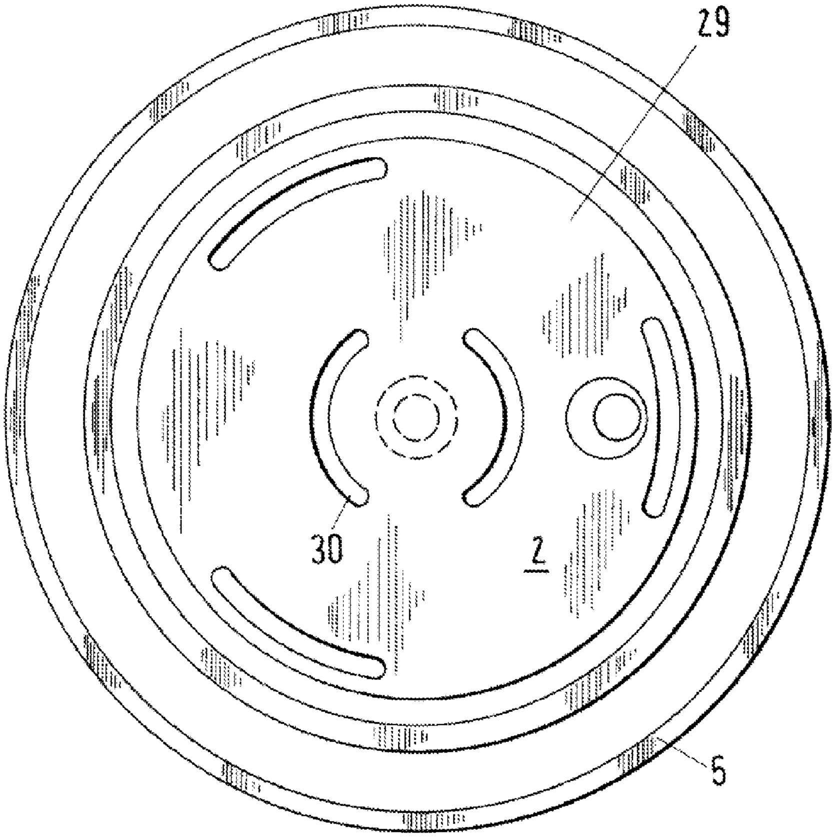
Figure 3:
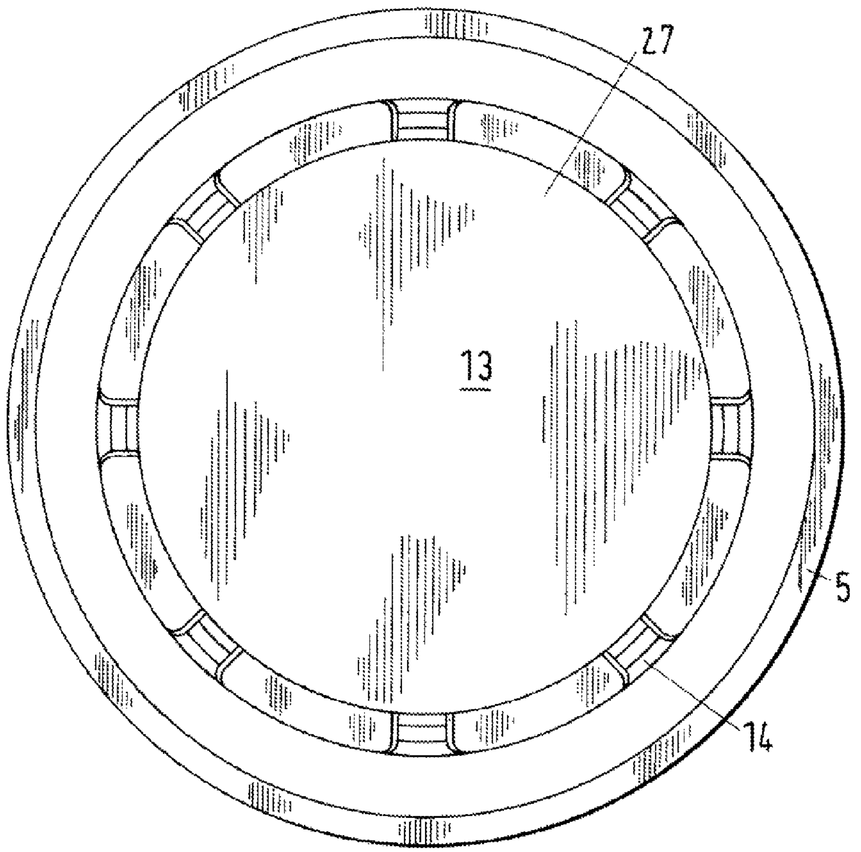
Figure 4:
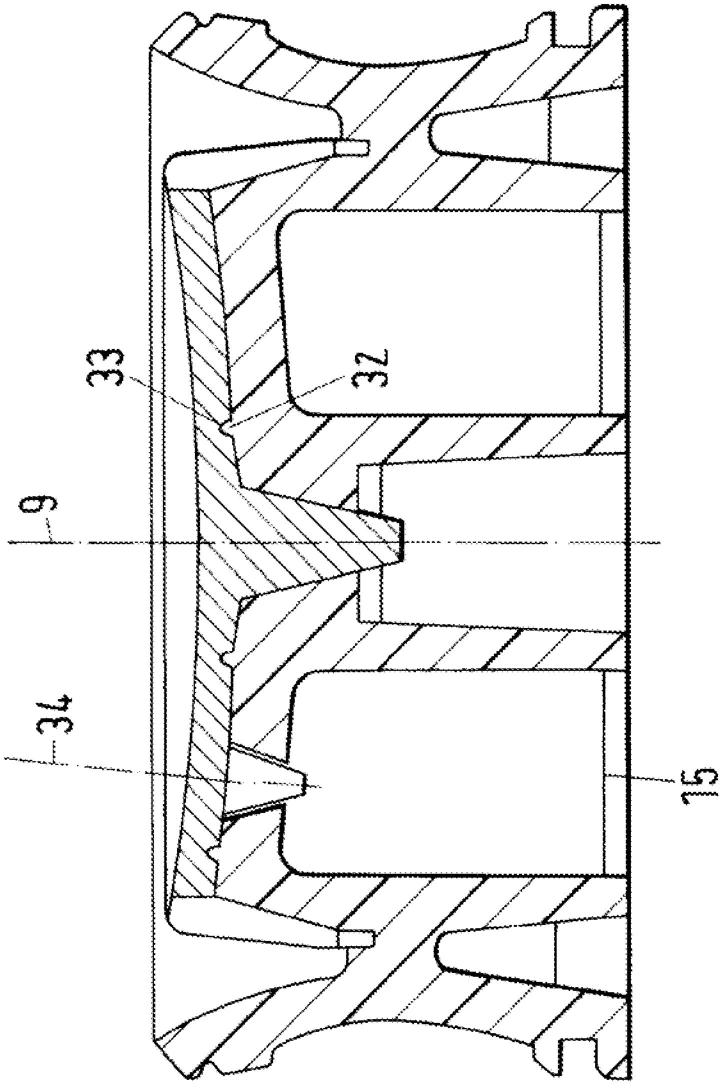
Figure 5:
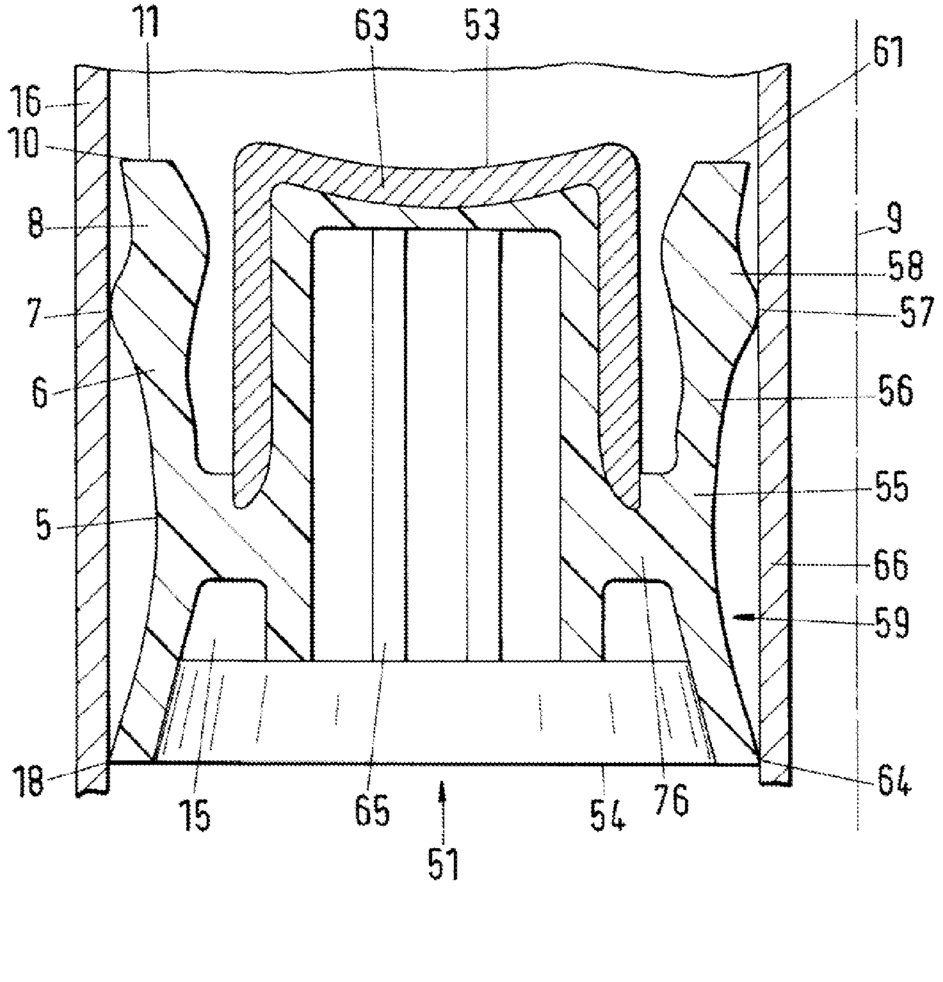

The invention will be explained in the following with reference to the drawings. There are shown:

FIG. 1 a piston in accordance with a first embodiment of the invention;

FIG. 2 a view of the media side of the piston body;

FIG. 3 a view of the media side of the piston;

FIG. 4 a piston in accordance with a second embodiment of the invention;

FIG. 5 a ring piston in accordance with a further embodiment of the invention.

FIG. 1 shows a piston in accordance with a first embodiment of the invention. The piston 1 includes a piston body 2 which is usually manufactured from plastic by means of an injection molding process. The piston 1 is preferably used to dispense a filler material, in particular of fluid or pasty media from a cartridge. The filler material can also contain solids. The filler material is located in a storage chamber of the cartridge 17 in which the piston 1 is displaceable. A wall 16 of the storage chamber of the cartridge 17 is shown in part. The piston 1 slides along the wall 16 and, in this movement, pushes the filler material through a dispensing opening, not shown. The side of the piston 1 facing the filler material should be called a media side 3 in the following. To set the piston 1 into motion and to keep it in motion, a compression force is applied by means of a dispensing device or by means of a compression fluid. The dispensing device 10, of which a plunger element is shown, is located on the side of the piston which is disposed opposite the media side 3. This side will be called the drive side 4 in the following.

The piston 1 includes a piston body 2 and a piston jacket 5. The piston body 2 is bounded by the drive side 4, by the media side 3 as well as by the piston jacket 5. The piston jacket 5 forms a connection between the media side 3 and the drive side 4, with the piston jacket 5 being arranged about a piston axis 9. The piston jacket 5 is connected to the piston body 2 via a ring-shaped web element 26 so that a peripheral groove 23 is formed at the media side between the piston body 2 and the piston jacket 5. In addition, stiffening 15 ribs are in most cases provided between the piston body 2 and the piston jacket 5. The piston jacket 5 is in particular formed rotationally symmetrical when the piston 1 is intended for reception in a cartridge 17 having a cylindrical storage chamber.

The piston 1 is usually a plastic component which is advantageously manufactured in an injection molding process.

In most cases, the piston body 2 has a plurality of cut-outs or is made as a hollow body. The piston body 2 and the piston jacket 5 are already made as thin-walled components from diameters of a few centimeters for reasons of saving material as well as due to the difficulties which the injection of thick-walled components gives rise to. The piston 2 receives the required shape stability through stiffening ribs 15. The stiffening ribs 15 are arranged on the drive side 4 of the piston 1. The provision of stiffening ribs 15 ensures that the piston 1 remains inherently stable even if the piston 1 is put under pressure loading by means of a dispensing device on the dispensing of the filler material.

In addition, the piston 1 has a cover element 13 which is attached to the piston body 2 on the media side 3. Such a cover element 13 can advantageously be made of a material which has a higher resistance with respect to the filler material than the material from which the piston is manufactured. The cover element 13 can thus develop a protective function for the piston body 2. A cover element 13 is thus preferably used when the filler material is prone to attacking the piston material. This applies in particular to pistons 1 of soft plastic such as LDPE. LDPE is attacked, for example, by polyester resins and swells up.

A jacket-shaped support element 21 is attached to the media side surface 27 of the cover element 13 at its outer periphery, in accordance with the embodiment in FIG. 1. The jacket-shaped support element 21 is in areal contact with the piston body 2. The cover element 13 thus has a drive side surface 29 which lies directly entirely on the media side surface 28 of the piston body 2. This means that the drive side surface 29 of the cover element 13 is in touching contact with the media side surface 28 of the piston body 2 such that substantially the entire common drive side surface 29 is attached to the media side surface 28 over the entire common contact surface.

Preferably, at least 60% of the drive side surface 29 of the cover element 13 are in areal contact with the media side surface 28 of the piston body 2, particularly preferred at least 75%, in particular at least 90%.

The jacket-shaped support element 21 projects into a peripheral groove 23 of the piston body 2 at the media side 3. The groove 23 has a groove base 36, with a receiving element 37 provided at the groove base 36 and with the margin 35 of the jacket-shaped support element 21 engaging into said receiving element. The cover element 13 is held there so that the cover element 13 cannot be released from the piston body 2. The fastening takes place by the difference in shrinkage of the two materials. The receiving element 37 for the jacket-shaped support element 21 furthermore acts as a support so that the cover element 13 can spring back into the original position after removal of the dispensing device 10. The margin 35 of the jacket-shaped support element 21 is designed as substantially cylindrical.

The cover element 13 has a media side surface 28 which is arranged disposed opposite the drive side surface 29. The media side surface 27 of the cover element 13 has a concave curvature.

There is an upper limit value for the speed of movement for a piston in accordance with the prior art. The speed of movement is understood as the speed at which the piston is moved to dispense the filler material present in the cartridge. If the speed of movement were to be increased further above this limit value, such a high pressure would be exerted onto the wall 16 of the cartridge 17 by the air that the wall 16 of the cartridge 17 bulges outwardly. Such an enlargement of the cross-sectional area of the cartridge 17 is already unwanted because the guide element 7 can lose contact with the wall 16 of the cartridge 17. Filler material can hereby move between the guide element 7 and the wall 16 onto the drive side of the piston. In addition, the piston 1 lacks the guidance so that the piston 1 can itself pivot or cant. For these reasons, the speed of movement was previously unable to be increased further in pistons in accordance with the prior art.

To increase the speed of movement, the cover element 13 can be manufactured from a material having higher inherent stability than the piston body 2. However, it was previously only possible to realize the connection of a cover element 13 to a piston body 2 with two substantial restrictions. On the one hand, an additional assembly step has to be provided to connect the piston body 2 and the cover element 13 to one another which are manufactured in two different worksteps. Due to this additional assembly step, a joining together of a valve element 22 with an axis 34 can only take place when the axis 34 of the valve element 22 is aligned parallel to the piston axis 9. Only under this constraint can the cover element 13, which contains the valve element 22, be inserted free of destruction into the corresponding cut-out of the piston body 2 such that the leak tightness with respect to the discharge of filler material onto the drive side 4 of the piston can remain ensured.

If the axis 34 of the valve element 22, in contrast, has an intersection with the piston axis 9, or if it includes an angle with the piston axis 9 which is greater than 0° and less than 90°, the piston body 2 and the cover element 13 cannot be brought into engagement with one another in a destruction-free manner. On the use of the conventional injection molding process, the axis 9 of the piston body 2 and the axes of each pin element 19 or valve element 22 therefore have to be aligned parallel to one another.

It is possible to combine two materials of different stiffness in the multicomponent injection molding process. This combination is also possible when the piston body 2 is aligned to the valve element 22 such that their axes include an angle to one another which is greater than 0°. If in particular a cover element 13 having a concave media side surface 27 is used, it can be assembled free of strain in the multicomponent injection molding process. If the material of the cover element 13 has a thermal expansion differing from the material of the piston body 2, the cover element 13 can enter into a more solid, that is denser, connection with the piston body 2 similar to a shrink connection. This means that the passages between the piston body and the cover element are tightly closed as long as the pin element 19 or the valve element 22 is not opened. The cross-sectional area of the passage opening for the air can thus be selected larger because the sealing function is taken over by the cover element 13 and the piston body 2.

If the valve element 22 is opened, the throughput of the air can be increased because the larger passage opening is released so that the air passing through the passage opening can be led off faster without an additional effort hereby become necessary in the assembly of the piston body 2 and of the cover element 13. A plurality of valve elements can naturally also be provided, in particular also for a ring piston in accordance with FIG. 5. An indentation 30 which engages into a corresponding bulge 31 of the drive side surface 29 of the cover element 13 is provided at the media side surface 28 of the piston body 2. The bulge 31 in accordance with FIG. 1 or the bulge 32 in accordance with FIG. 4 is a notch which is arranged about the piston axis 9 as part of a ring. The notch has a function as a sealing element due to the specific contour. Therefore the bulge 32 contacts the indentation 33 along the entire common surface. The sealing function is in turn obtained by the difference in shrinkage of the different materials. The shrinkage in a polyamide, for example, amounts to 0.8% on average and in a low density polyethylene to 2.2%. The difference between the polyamide and the low density polyethylene accordingly amounts to 1.4%. This means that a polyamide component jacketed with low density polyethylene is sealingly received in the polyethylene jacket in the cooled state due to the larger shrinkage in the polyethylene jacket. A plurality of bulges 31, 32 can be arranged at different radial intervals from the piston axis, which is shown in FIG. 2.

The cover element 13 contains a pin element 19 which extends through the piston body 2 to the drive side of the piston 1. The pin element 19 is made as a conical plug-in element. The pin element 19 is furthermore rotationally symmetrical with respect to the piston axis 9.

The cover element 13 or the piston body 2 can also contain a venting element 14. This venting element serves to remove gases from gas inclusions from the inner piston space which arise, for example, on the insertion of the piston into the cartridge wall. The gas can in particular be air. The bulges 31, 32 are advantageously arranged offset to one another so that the gas can flow along a curve-shaped connection path. A labyrinth-like structure is formed by the arrangement of the bulges 31, 32.

Such a venting element 14 is shown in section in FIG. 1 and a view of the piston 1 on its media side is shown in FIG. 3. Gas which is located in the inner space of the cartridge 17 between the filler material and the piston 17 can escape to the outside, that is to the drive side 4, through this venting element 14 without the filler material being discharged. The venting element 14 is closed as long as the cartridge 17 is stored in the filled state. If the filler material should be dispensed, the dispensing device 10 is brought into contact with the piston 1 at its drive side 4. In this respect, the dispensing device can also come into contact with a pin element 19 or with a valve element 22 of the cover element 13. The pin element 19 or the valve element 22 can be opened by means of an opening element which is connected to the dispensing device 10 at the drive side in that the pin element 19 rises from its seat 20 when the dispensing device 10 comes into contact with the drive side 4. The flow path for the gas is opened in this respect. The gas passes via the jacket-shaped support element 21 of the cover element 13 into the intermediate space between the cover element 13 and the piston body 2 and exits the storage chamber through the piston via the opened flow path through the opening between the pin element 19 and the seat 20 or between the valve element 22 and the seat 24. After the actuation of the valve element 22, the seal is ensured via the restoration behavior of the concave contour of the cover element 13. The concave contour can in particular be made as part of a spherical surface. As a venting element 14 plurality of small venting gaps are usually provided in the jacket-shaped support element 21.

A labyrinth-like connection path can be provided between the piston body 2 and the cover plate 13 subsequent to these venting gaps. Any filler material passing through the venting element is deposited along this labyrinth-like connection path. This connection path is closed in FIG. 1 since the pin element 19 and the valve element 22 are both closed in a state in which the cover element 13 lies directly entirely on the first media surface of the piston body 2 at the media side.

The cover element 13 is adjustable between a first state and a second state. The first state is a state in which the cover element 13 overlies the media side surface 28 of the piston body 2. The second state is a state in which the cover element 13 is separated from the media side surface 28 of the piston body 2 to form an area that is a connection path between the piston body 2 and the cover element 13.

The valve element 22 is adjustable between an open state and a closed state. The open state is a state in which the valve element 22 is disposed towards the media side 3 of the piston 1. The closed state is a state in which the valve element 22 is disposed towards the drive side 4 of the piston 1.

The piston 1 has means against the discharge of filler material at the drive side. For this purpose, at least one sealing lip is usually provided along the sliding surface at the wall 17 of the cartridge 16. In the present embodiment, this sealing lip is shown as a guide element 7. The guide element 7 is located at a projection 6 which extends between the groove 23 and the wall 16 of the cartridge 17. The projection 6 in the embodiment is a thin-walled rotationally symmetrical body which is visible in the sectional representation as an arm of the piston body 2.

What is not visible in the sectional figure is the fact that the arm belongs to a ring-shaped bead which extends along the total circumference of the piston body 2 and forms a fluid-tight connection with the wall 16 of the cartridge 17 via the guide element 7.

The projection 6 has a guide element 7 for the guidance of the piston in a cartridge 17 which is suitable for the establishing of a sealing contact to a wall 16 of the cartridge 17. The guide element 7 can in particular be made as a sealing lip. If required, a plurality of sealing lips can also be provided. Alternatively or in addition to this, the piston jacket 5 can also contain a cut-out 25 for a sealing element such as an O ring. The projection 6 includes a scraper element 8 which has a smaller spacing from the media side 3 than the guide element 7 in the non-installed state.

At the start of the dispensing of the filler material with a piston in accordance with FIG. 1, the projection 6 is already introduced into the inner space of the cartridge 17. The piston with the guide element 7 does not lie on the wall 16 of the cartridge in the installed state. The filler material is located at the media side 3 of the piston. If the piston body 2 is now moved toward the filler material in the direction of the piston axis 9 by a discharge device, not shown, a compression force from the filler material acts on the piston. This compression force also acts on the projection 6. The projection 6 advantageously has a support surface 11 which is moved in the direction of the wall 16 under the action of the compression force. A gap which may be present between the support surface 11 or the associated scraper element 8 and the wall 16 therefore becomes smaller due to the inner pressure. If the filler material contains solids, individual particles cannot move into the gap between the support surface 11 and the wall 16. The support surface 11 is thus arranged such that any solid particles taken up by means of the scraper element 8 are dispensed together with the filler material. If the dispensing continues, the particles will slide ever further at the support surface 11 in the direction of the groove 23.

A tilt securing element 18 is arranged on the drive side 4 of the piston and serves for the improvement of the guidance of the piston in a cartridge 17. In addition, the tilt securing element 18 can act as a second sealing lip, in particular to ensure a leak tightness even when the first sealing lip starts to leak. The piston is guided securely against tilting by the tilt securing element 18 which is in contact with the wall 16 of the cartridge 17, that is the axis of the piston body 2 coincides with the piston axis 9. It is ensured by the tilt securing element 18 that the media side 3 is arranged in a normal plane to the piston axis 9 or, if the media side 3 is not a planar surface or contains sections which do not lie in one plane, that points of the piston surface at the media side which are characterized by a specific radius and a specific height are disposed in substantially the same normal plane along the circumference. If the piston 1 were to tilt, the condition for such rotationally symmetrical points would no longer be satisfied. A contact with the wall 16 of the cartridge 17 at the circumferential side can be maintained during the whole dispensing procedure by such a tilt securing element 18 so that a deflection of the piston 1 can be prevented together with the previously described guide element 7.

Unlike FIG. 1, FIG. 4 shows that a bulge 32 which engages into a corresponding indentation 33 of the drive side surface 28 of the cover element 13 is provided at the media side surface 29 of the piston body 2. This bulge also acts as a sealing element.

FIG. 5 shows a ring piston 51 such as is used for coaxial cartridges. The representation does not contain the fastening or mechanical anchoring already described in connection with the previous embodiments, a valve spigot and the sealing elements, in particular circular sealing elements which can also be present in this embodiment in the same manner. Two or more cylindrical hollow spaces arranged coaxially to one another are arranged in a coaxial cartridge. Each of these hollow spaces is filled with a component. The inner hollow space or spaces are completely surrounded by the outer hollow space which is made as a cylindrical cartridge.

The ring piston 51 includes a piston body 52 which is usually manufactured from plastic by means of an injection molding process. The ring piston 51 is preferably used to dispense a filler material, in particular of fluid or pasty media, from a cartridge. The filler material can in particular also contain solid particles. A wall 16 of the cartridge 17 is shown. The ring piston 51 slides along the wall 16 and, in this movement, pushes the filler material through a dispensing opening, not shown. The side of the ring piston 51 facing the filler material should be called a media side 53 in the following. To set the ring piston 51 into motion and to keep it in motion, a compression force is applied by means of a dispensing device. The dispensing device, which is not shown here, is located on the side of the piston which is disposed opposite the media side 53. This side will be called the drive side 54 in the following.

Within the inner tube 67 there is in general arranged a further piston, in the following called inner piston, which is not shown in FIG. 5. This inner piston is configured in the same manner as the piston according to the embodiment of FIG. 1. The inner piston is moved concurrently with the ring piston 51, to dispense the filler material from the storage sections of the cartridge 17. In the following it is therefore uniquely referred to the configuration of the ring piston 51.

The piston body 52 is thus bounded by the drive side 54, by the media side 53 as well as by an outer piston jacket 5 and an inner piston jacket 55. The outer piston jacket 5 can have the same structure as in the preceding embodiments. The inner piston jacket 55 forms the inner connection between the drive side 54 and the media side 53. The inner piston jacket 55 bounds the piston body 52 at an inner side 59 facing the piston axis 9.

The inner piston jacket 55 merges at the media side 53 into a projection 56. The projection 56 in the embodiment is a thin-walled rotationally symmetrical body which is visible in the sectional representation as an arm of the piston body 52. The projection 56 has an inner guide element 57 for the guidance of the ring piston 51 along, that is in the direction of, the piston axis 9, for example along an inner tube 67. The guide element 57 is suitable for the establishment of a sealing contact with a wall 66 of the inner tube 67. The guide element 57 can in particular be made as a sealing lip. If required, a plurality of sealing lips can also be provided. The projection 56 can include a scraper element 58 which has a smaller spacing from the media side 53 than the guide element 57. The dimension of the ring piston which is closest to the filling or which even reaches into the filler material is determined for the determination of the spacing. With simple pistons, this dimension can be the piston surface or the cover element 63 covering the piston surface.

The guide element 57 lies on the wall 66 of the inner tube 67 and seals the inner space of the cartridge containing the filler material with respect to the environment so that a discharge of the filler material to the drive side is prevented.

A contact surface 61 which is arranged between 80° and 110°, in particular substantially normal, to the piston axis 9 adjoins the end of the piston jacket 55 which contains the guide element 57. The support surface 61 is thus arranged such that any solid particles taken up by means of the scraper element 58 are dispensed together with the filler material. If the contact surface 61 is arranged substantially normal to the piston axis, the solid particles migrate in the direction of the piston axis. A collection of solid particles can thus be prevented in the region close to the wall.

The ring piston 51 can likewise contain a venting element, which is not shown in the drawing here. The piston body 52 also has stiffening ribs 65 as well as a tilt securing element 18, 64. The cover element 63 can furthermore be made in the same way as is described in connection with FIG. 1 to FIG. 4.

The cover element 63 of the ring piston 51 according to FIG. 5 has a media side surface 77 as well as a drive side surface 79. The piston body 52 also has a media side surface 78. It can be also seen from this embodiment that the drive side surface 79 of the cover element lies directly entirely on the media side surface 78 of the piston body 52.

The invention claimed is:

1. A piston comprising:

a piston body having a first media side surface and a first drive side surface;

a cover element having a second media side surface and a second drive side surface, the second drive side surface of the cover element being configured to entirely abut the first media side surface of the piston body to close a connection passage therebetween; and a piston jacket arranged about a piston axis and connected to the piston body by a web element so that a peripheral groove surrounding the first media side surface is formed between the piston body and the piston jacket, the cover element comprising a valve element passing through the piston body to a drive side of the piston, the valve element having an end extending through a corresponding seat of the valve element and being axially movable from the corresponding seat to open a venting gap configured to enable air to flow from a media side of the piston to a drive side of the piston and to open the connection passage.

2. The piston in accordance with claim 1, wherein the second media side surface of the cover element has a concave curvature.

3. The piston in accordance with claim 1, wherein the first media side surface of the piston body includes at least one of an indentation and a bulge, the indentation being adjacent a corresponding bulge at the second drive side surface of the cover element, the bulge being adjacent a corresponding indentation at the second drive side surface such that the bulge contacts the corresponding indentation along an entire common surface between the bulge and the corresponding indentation.

4. The piston in accordance with claim 3, wherein the bulge is arranged about the piston axis as part of a ring.

5. The piston in accordance with claim 1, wherein the valve element is a conical plug-in element.

6. The piston in accordance with claim 1, wherein the valve element is a pin element that is rotationally symmetrical with respect to the piston axis.

7. The piston in accordance with claim 1, further comprising a jacket-shaped support element attached to an outer periphery of the cover element.

8. The piston in accordance with claim 7, wherein the jacket-shaped support element projects into the peripheral groove at the media side.

9. The piston in accordance with claim 8, wherein the peripheral groove has a groove base and a receiving element provided at the groove base, a margin of the jacket-shaped support element engaging the receiving element.

10. The piston in accordance with claim 7, wherein the jacket-shaped support element contains at least one venting element connectable to the venting gap and connected to the connection passage between the cover element and the piston body.

11. The piston in accordance with claim 10, wherein the receiving element is configured to be detachably connected to the groove base, the receiving element being a supporting element for the cover element when the cover element lies directly on the media side surface of the piston body.

12. The method for the manufacture of a piston in accordance with claim 1, comprising:

manufacturing the piston body by an injection molding process to form an injection molded apparatus; and attaching the cover element by a multicomponent injection molding process on the injection molded apparatus.

13. The piston in accordance with claim 1, wherein the piston body further comprises stiffening ribs arranged on the drive side of the piston.

14. The piston in accordance with claim 1, wherein the cover element is made of a material having a higher resistance with respect to a filler material than a material from which the piston body is made.

15. The piston in accordance with claim 1, wherein the valve element has a center axis that is parallel to the piston axis.

16. A piston comprising:

a media side;

a drive side disposed opposite the media side;

a piston body bounded by the media side and the drive side; and a piston jacket, the piston body being bounded at a peripheral side by the piston jacket, the media side of the piston body comprising a first media side surface, a connection being formed between the media side and the drive side of the piston by the piston jacket, the piston jacket being arranged about a piston axis and being connected to the piston body via a web element so that a peripheral groove surrounding the first media side surface is formed on the media side between the piston body and the piston jacket, a cover element being arranged at the media side and comprising a second media side surface and a drive side surface, the drive side surface of the cover element configured to entirely abut the first media side surface of the piston body, and the cover element comprising at least one of a pin element and a valve element that passes through the piston body to the drive side of the piston, at least one of an indentation and a bulge is provided at the first media side surface of the piston body, the indentation engaging into a corresponding bulge of the drive side surface of the cover element, the bulge engaging into a corresponding indentation of the drive side surface of the cover element such that the bulge is in touching contact with the indentation along the entire common surface, and a plurality of bulges being arranged at different radial spacings from the piston axis.

17. The piston in accordance with claim 16, wherein the bulges are partially offset from one another in a circumferential direction.

18. A piston comprising:

a cover element having a first media side surface and a drive side surface;

a piston body having a second media side surface, the drive side surface of the cover element configured to abut the media side surface of the piston body; and a piston jacket arranged about a piston axis and connected to the piston body by a web element so that a peripheral groove surrounding the second media side surface of the piston body is formed between the piston body and the piston jacket, and the cover element further having a valve element disposed radially offset from a center piston axis and extending axially through the piston body.

* * * * *